(12) United States Patent
Sato

(10) Patent No.: US 6,416,263 B1
(45) Date of Patent: Jul. 9, 2002

(54) PIPING STRUCTURE, EXISTING PIPE CUTTING METHOD AND FLUID SUPPLY SUSPENSION-FREE METHOD

(75) Inventor: Toshiyuki Sato, Shiga (JP)

(73) Assignee: Suiken Co., Ltd., Shiga (JP)

( * ) Notice: Subject to any disclaimer, the term of this patent is extended or adjusted under 35 U.S.C. 154(b) by 0 days.

(21) Appl. No.: 09/536,926

(22) Filed: Mar. 28, 2000

(30) Foreign Application Priority Data

Aug. 26, 1999 (JP) .......................................... 11-239613

(51) Int. Cl.[7] ................................................ B23C 3/00
(52) U.S. Cl. ..................... 409/132; 137/318; 408/1 R; 408/88; 409/175; 409/178; 409/190
(58) Field of Search ................................. 137/318, 546; 409/131, 132, 175, 177, 178, 190; 408/1 R, 88, 97, 105

(56) References Cited

U.S. PATENT DOCUMENTS

| 2,373,341 A | * | 4/1945 | Rowe ......................... 409/177 |
| 2,571,916 A | * | 10/1951 | McKinley ................... 409/175 |
| 2,898,783 A | * | 9/1959 | Kiesling ...................... 408/88 |
| 3,354,784 A | * | 11/1967 | Zemberry .................. 409/177 |
| 3,466,972 A | * | 9/1969 | Strait ......................... 409/177 |
| 5,046,903 A | * | 9/1991 | Nagayoshi et al. ......... 409/190 |
| 6,050,753 A | * | 4/2000 | Turner ......................... 408/88 |
| 2001/0010233 A1 | * | 8/2001 | Sato et al. .................. 137/318 |
| 2001/0017159 A1 | * | 8/2001 | Sato et al. .................. 137/318 |
| 2002/0007851 A1 | * | 1/2002 | Sato et al. .................. 137/318 |

FOREIGN PATENT DOCUMENTS

JP           7-136420          5/1995

* cited by examiner

Primary Examiner—Daniel W. Howell
(74) Attorney, Agent, or Firm—Jordan and Hamburg LLP

(57) ABSTRACT

A piping structure of the present invention comprises an existing pipe and a seal-up housing. The existing pipe has a collection opening formed in the bottom thereof. The seal-up housing comprises two or more housing parts which are segmented circumferentially of the existing pipe. The seal-up housing encloses a part including the collection opening of the existing pipe. One of the housing parts is formed with a collection space and a drain port. The collection space serves to collect dirt or foreign substances through the collection opening. The drain port is provided for discharging the dirt or foreign substances stored in the collection space.

6 Claims, 9 Drawing Sheets

PIPING STRUCTURE, EXISTING PIPE CUTTING METHOD AND FLUID SUPPLY SUSPENSION-FREE METHOD

BACKGROUND OF THE INVENTION

1. Field of the Invention

The present invention relates to a piping structure, an existing pipe cutting method and a fluid supply suspension free method.

2. Description of the Related Art

Existing running fluid pipes such as water pipes may possibly contain dirt or foreign substances such as sands, rust powders and metallic powders. Catching or collecting those foreign substances may therefore be indispensable. Such foreign substances have thus been collected and removed up until now. A known dirt collector is provided for example with a dirt reservoir expanding radially from the running fluid pipe body, the dirt reservoir having therein a meshed filter located at right angles to the axis of pipe (e.g., Japanese Patent Laid-open Pub. No. Hei7-136420).

Existing pipe lines have however often included sites free from such dirt collectors.

SUMMARY OF THE INVENTION

It is therefore the object of the present invention to provide a piping structure and so forth capable of collecting dirt or foreign substances without any suspension of the supply of a fluid such as water or oil.

In order to achieve the above object, according to a first aspect of the present invention there is provided a piping structure comprising an existing pipe and a seal-up housing. The existing pipe has a collection opening formed in the bottom thereof. The seal-up housing comprises two or more housing parts which are segmented in the circumferential direction of the existing pipe. The seal-up housing encloses a part of the existing pipe including the collection opening. One of the housing parts is formed with a collection space and a drain port. The collection space is adapted to collect dirt or foreign substances through the collection opening. The drain port communicates with the collection space, for discharging the dirt or foreign substances stored in the collection space.

In the piping structure of the present invention, the collection opening is most preferably an elongated cut groove which is formed in the axial direction of the existing pipe.

In order to form the cut groove, according to a second aspect of the present invention there is provided a method of cutting an existing pipe comprising an assembling step and a cutting step.

In the assembling step, the existing pipe is partially enclosed in a hermetically sealed manner by a seal-up housing consisting of a plurality of housing parts which are segmented in the circumferential direction of the existing pipe. A cutting unit having a cutting tool is mounted on the seal-up housing.

In the cutting step, the cutting tool is turned by the power of a prime mover so that the cutting tool can perform a cutting action for cutting the bottom of the existing pipe. The cutting step includes allowing a radial cut of the cutting tool into the existing pipe while turning the cutting tool to impart the cutting action to the same and includes displacing the seal-up housing in the axial direction of the existing pipe simultaneously with the cutting action. By imparting a feed action to the cutting tool through the axial movement of the seal-up housing in this manner, the existing pipe is cut by means of the cutting tool without creating any cut-off sections. The cutting tool thus forms an elongated rectilinear groove in the bottom of the existing pipe in the axial direction thereof.

In order to obtain the piping structure of the present invention, according to a third aspect of the present invention there is provided a fluid supply suspension-free method comprising an assembling step and a drilling step.

In the assembling step, an existing pipe is partially enclosed by a seal-up housing consisting of a plurality of housing parts which are segmented in the circumferential direction of the existing pipe. The seal-up housing is provided with a collection space and a drain port. The collection space is adapted to collect the dirt or foreign substances through a collection opening formed in the bottom of the existing pipe. The drain port is provided for discharging the dirt or foreign substances stored in the collection space.

In the drilling step, the collection opening is formed in the bottom of the existing pipe lying within the seal-up housing without any suspension of the fluid supply.

Any dirt or foreign substances residing within the existing pipe will migrate through the collection opening down into the collection space and collected therein.

According to a fourth aspect of the present invention there is provided a fluid supply suspension-free method preferably comprising an assembling step, a cutting step and a tool removal step which follow.

The operator first prepares a seal-up housing comprising two or more housing parts which are segmented in the circumferential direction of an existing pipe. One of the housing parts is previously provided with a collection space and a branching portion. The collection space is configured to be suited to collect dirt or foreign substances through a rectilinear groove formed in the bottom of the existing pipe. The branching portion is provided for allowing a cutting tool to advance or retreat (i.e., to cut into the existing pipe in the radial direction thereof).

In the assembling step, the existing pipe is partially enclosed by the seal-up housing in a hermetically sealed manner. A cutting unit having a cutting tool is mounted on the seal-up housing by way of an operation valve.

In the cutting step, the cutting tool is turned by the power of a prime mover so that the cutting tool can perform a cutting action for cutting the bottom of the existing pipe. The cutting step includes allowing a radial cut of the cutting tool into the existing pipe while turning the cutting tool to impart to the same the cutting action and includes displacing the seal-up housing in the axial direction of the existing pipe simultaneously with the cutting action. By imparting a feed action to the cutting tool through the axial movement of the seal-up housing in this manner, the existing pipe is cut by means of the cutting tool without creating any cut-off sections. The cutting tool thus forms an elongated rectilinear groove in the bottom of the existing pipe in the axial direction thereof.

In the tool removal step, the cutting tool is withdrawn from the branching portion after formation of the rectilinear groove.

Any dirt or foreign substances residing within the existing pipe will migrate through the rectilinear groove down into the collection space and collected therein.

The present invention enables a dirt collection apparatus to be mounted on the existing pipe without requiring any suspension in the fluid supply. Furthermore, any large-scale work will not be needed since the collection opening is formed in the bottom of the existing pipe in place of cutting off the existing pipe.

In particular, the present invention provides the collection opening in the form of an axially substantially elongated opening such as the cut groove elongated in the axial direction of the existing pipe, thereby preventing any dirt or foreign substances from jumping across the substantially elongated opening, to consequently achieve a secure collection of the dirt or foreign substances.

In the present invention, the "existing pipe" refers to a pipe through which flows a fluid such as water or oil and which is often situated under the ground.

The term "seal-up" does not mean completely sealing, but means keeping watertightness to such an extent that a work can be done without any suspension of the fluid supply. Therefore, the "seal-up housing" refers to a housing having a pressure resistance enough to resist the pressure of the fluid flowing through the existing pipe and having a certain level of water stop ability.

As used herein, "enclose something in a hermetically sealed manner" means sealing something to such an extent as not to hinder the cutting operation and so forth. For example, the drain port provided in the seal-up housing may remain opened during the cutting operation so that cutting chips can be discharged together with the fluid through the drain port.

The "cutting tool" for use in this method is preferably a milling-like tool whose tip surface and peripheral surface are each provided with a plurality of cutting edges.

In the event of cutting an existing pipe having a mortar lining formed on its inner surfaces, use is made preferably of a cutting tool provided with a multiplicity of hard metal chips or of a cutting tool having cutting edges made of grains of diamond.

In the present invention, "cutting" means removing a part of the pipe wall through turns of the cutting edges. As used herein, the "cutting action" means turning the cutting edges, whereas the "feed action" means moving the cutting tool to positions where virgin areas of the pipe wall can be cut in succession by the cutting tool.

DESCRIPTION OF THE PREFERRED EMBODIMENTS

Figure 1:
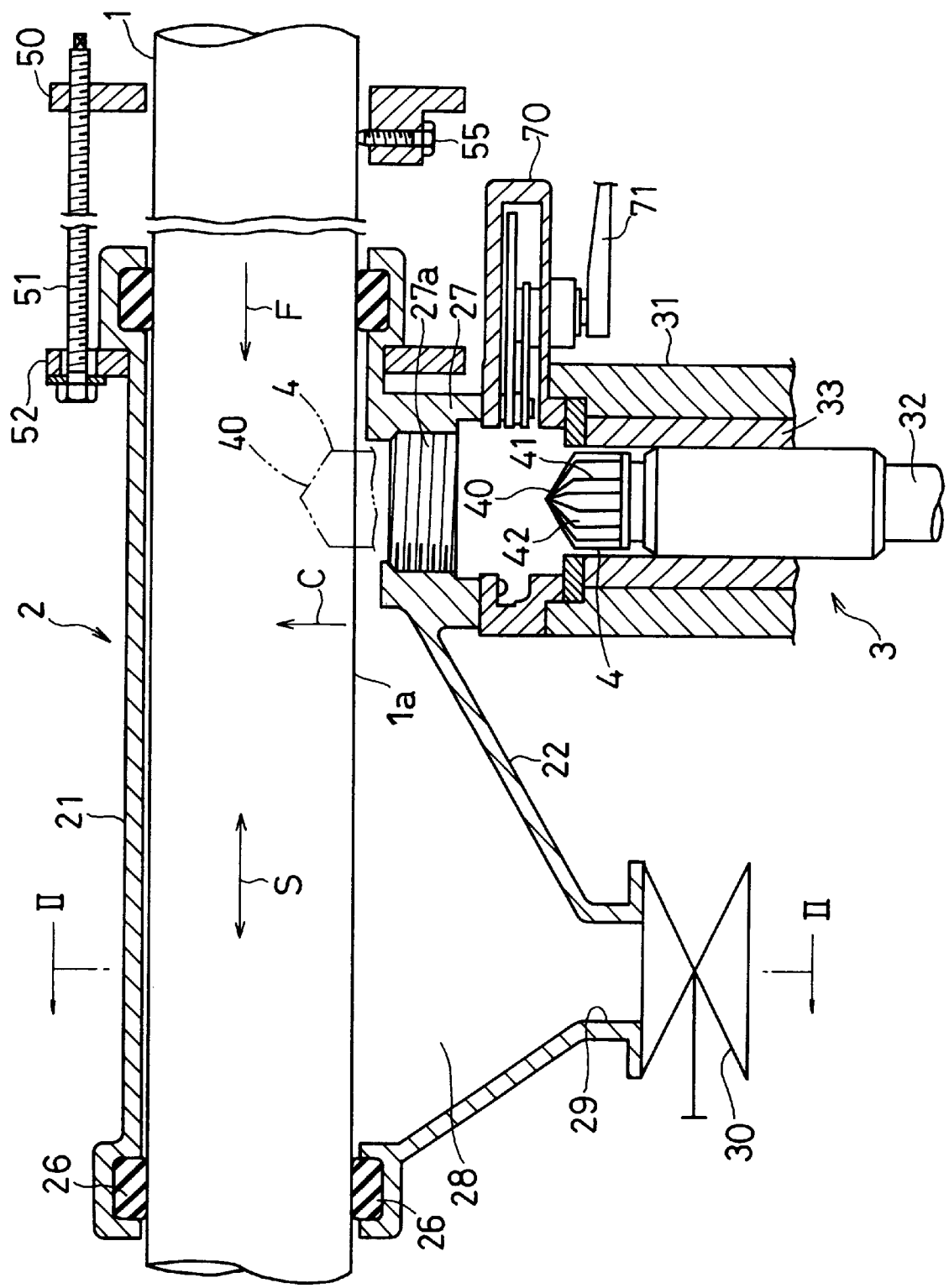
FIG. 1 is a longitudinal sectional view showing an assembling step of a method in accordance with a first embodiment of the present invention.

The present invention will become more apparent from the following detailed description of the preferred embodiments when taken in conjunction with the accompanying drawings. It is however to be noted that the embodiments and the drawings are shown for the illustrative purposes only and that the invention is delimited only by the appended claims. In the drawings attached, like reference numerals in a plurality of figures denote the same or corresponding parts.

The embodiments of present invention will now be described with reference to the drawings.

FIGS. 1 to 4 illustrate a first embodiment thereof.

Seal-up Housing 2

Figure 2:
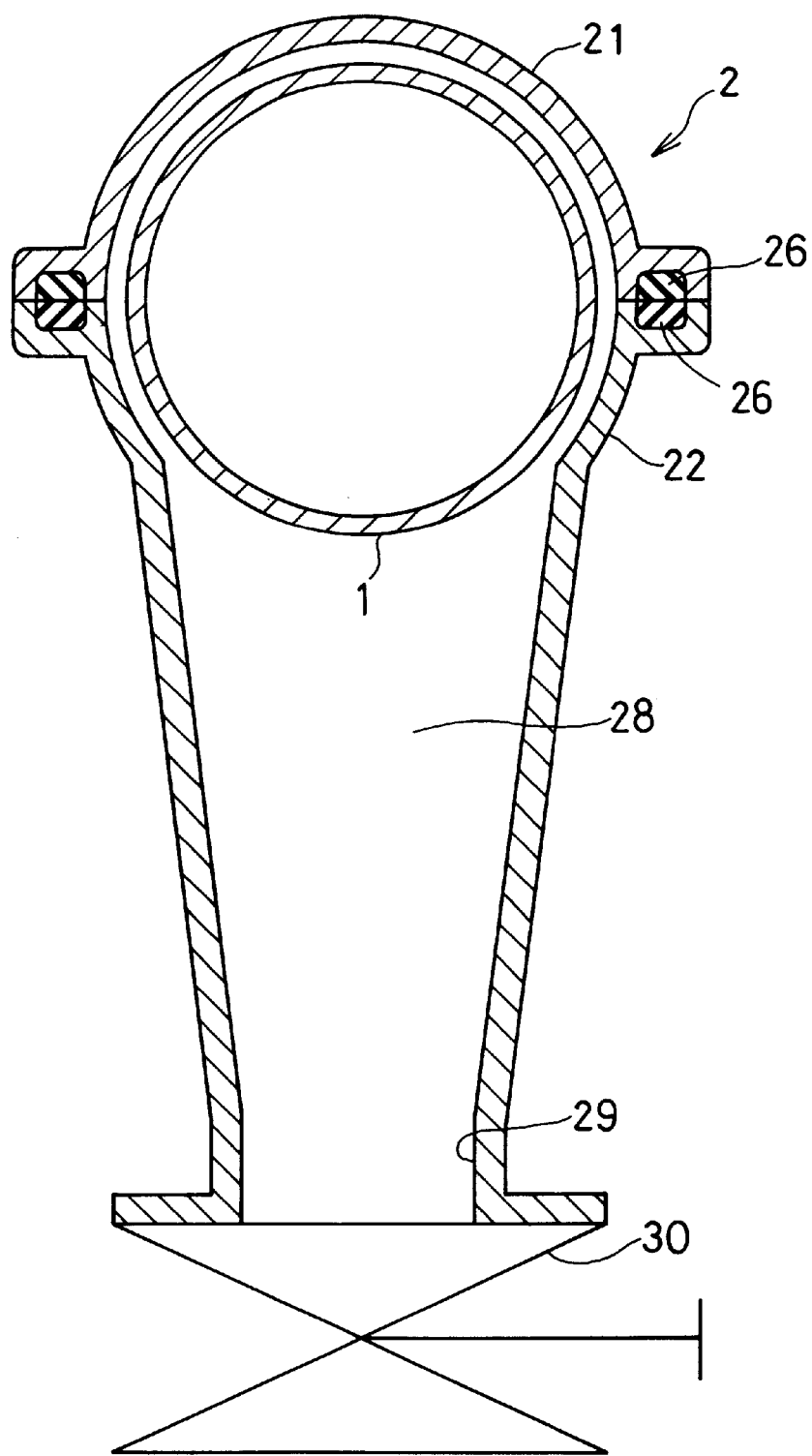
FIG. 2 is a sectional view taken along a line II—II of FIG. 1.

As illustrated in FIGS. 1 and 2, a seal-up housing is generally designated at 2 and comprises first and second housing parts 21 and 22 which are bisected in the circumferential direction of an existing pipe 1. Rubber packings 26 are provided to hermetically seal the gap between the seal-up housing 2 and the existing pipe 1 and the connection between the first housing part 21 and the second housing part 22 as shown in FIG. 2. The first housing part 21 serves to cover the existing pipe 1 from above, while the second housing part 22 serves to cover the existing pipe 1 from below.

The second housing part 22 is provided with a branching portion 27 and a dirt reservoir 28 which lie on a line extending in the axial direction S of the existing pipe 1. The branching portion 27 protrudes in a branched manner downward in the radial direction C of the existing pipe 1. A cutter case 31 of a cutting unit 3 is fixedly secured to the branching portion 27 by way of an operation gate valve 70. Rubber rings not shown provide seals for any possible gaps between the branching portion 27 and the operation gate valve 70 as well as between the operation gate valve 70 and the cutter case 31. The branching portion 27 is formed with an internally threaded portion 27a into which a plug 60 of FIG. 4 is screwed.

Figure 4:
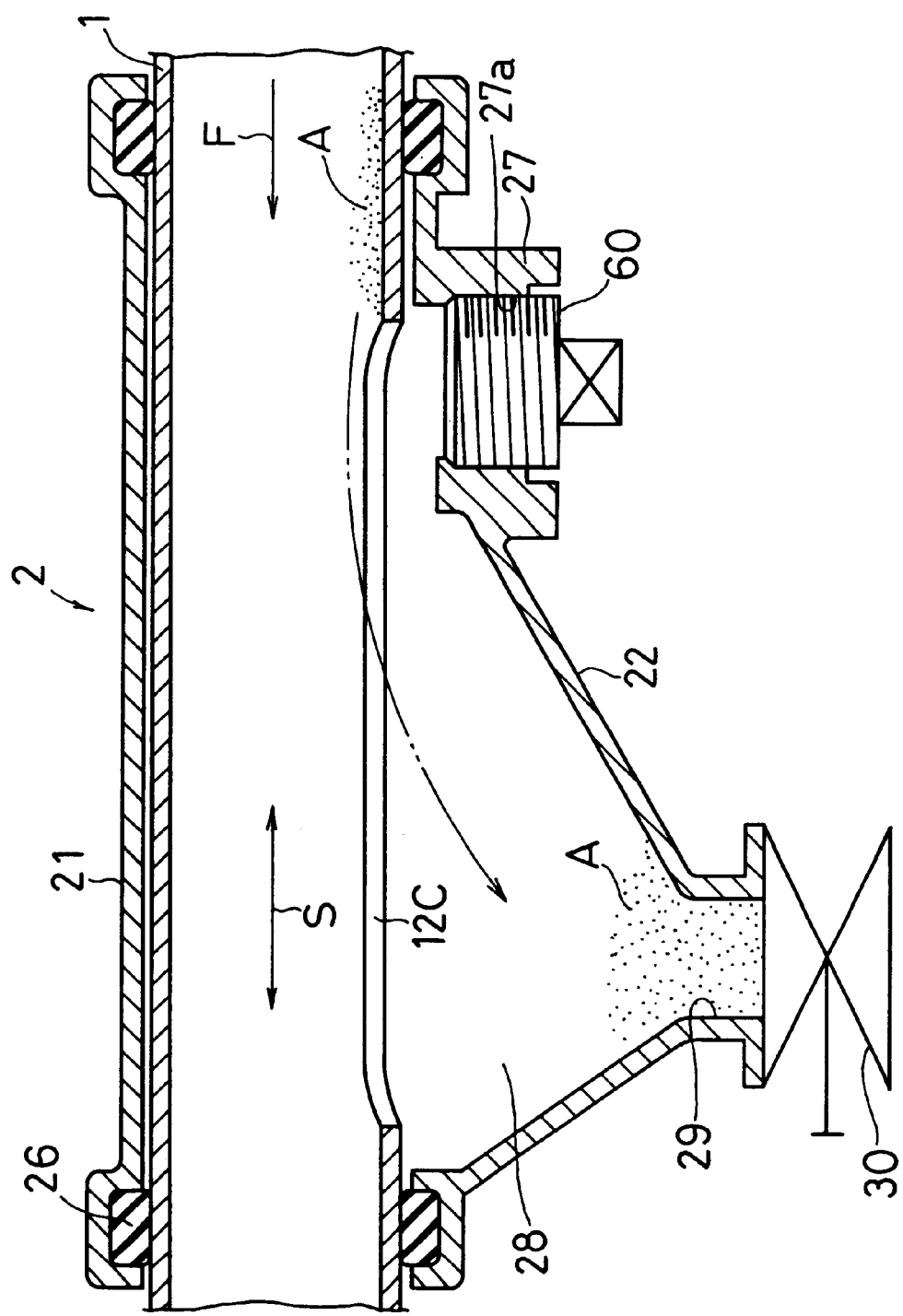
FIG. 4 is a longitudinal sectional view showing a piping structure.

The dirt reservoir 28 of FIG. 4 is tapered so as to be have a reduced diameter radially outwardly of the existing pipe 1 whereby there is formed a space suitable to store the dirt A. The dirt reservoir 28 has at its lower end a drain port 29 for discharging the dirt A stored. The drain port 29 is fitted with a discharge valve 30 which opens or closes for selective discharge of the dirt A. The discharge valve 30 is provided with a flexible horse not shown coupled thereto.

Cutting Unit 3

Referring back to FIG. 1 the cutting unit 3 comprises the cutter case 31, a cutter rod 32, a bearing portion 33 and a cutting tool 4. The cutter rod 32 is coupled to a prime mover (e.g. , a motor) disposed outside of the cutter case 31 so that it is turned by power of the motor. One end of the cutter rod 32 is provided with the cutting tool 4 like an end mill, rigidly fastened thereto. The cutting tool 4 thus turns on the cutter rod 32 by power of the motor.

The cutter tool 4 includes a conically shaped tip surface 40 and a substantially cylindrical peripheral surface 41, both the surfaces 40 and 41 having a multiplicity of cutting edges 42 thereon. The cutting tool 4 is housed in the cutter case 31. It will be understood that this cutting unit 3 can be of the same structure as known drilling machines with the exception of its end mill shaped cutting tool 4.

The method will be described hereinbelow.

Assembling Step

First, with liquid (water) flowing through the interior of the existing pipe 1 of FIG. 1, the seal-up housing 2 is mounted on the existing pipe 1 by an operator in such a manner that the branching portion 27 of the second housing part 22 is positioned upstream of the dirt reservoir 28 in the direction of flow F of the liquid (water). After this mounting, the first and second housing parts 21, 22 are put together by the operator using assembly bolts not shown. The operation gate valve 70 and the cutting unit 3 are then fitted by the operator to the seal-up housing 2. The existing pipe 1 is thus partially enclosed by the seal-up housing 2 in a hermetically sealed condition.

By means of setscrews 55, a fixed plate 50 is then fixedly secured by the operator to the existing pipe 1 at a position apart from the seal-up housing 2 in the axial direction S of the existing pipe 1. The position to fix the fixed plate 50 is determined depending on the length of grooves to be formed. A feed screw 51 is threaded into the fixed plate 50 so as to allow a displacement of the seal-up housing 2 in the axial direction S. One end of the feed screw 51 engages with the end portion of the seal-up housing 2 by way of a flange 52. The feed screw 51 is thus turned counterclockwise by the operator in order that the seal-up housing 2 can be displaced rightward in the axial direction S.

Cutting Step

Following the assembling step, the branching portion 27 and the dirt reservoir 28 are positioned by the operator immediately under the existing pipe 1. The cutting unit 3 is then operated by the operator so that the cutting tool 4 can rise up to a position at which the tip surface 40 of the cutting tool 4 is in close vicinity to the bottom surface of the existing pipe 1. When the motor not shown is thereafter activated by the operator, the cutting tool 4 turns together with the cutter rod 32 to start a cutting action to cut the existing pipe 1. During the cutting action, the operator acts on the cutting unit 3 so as to allow the cutting tool 4 to rise in the radial direction C, with the result that as indicated by a chain double-dashed line of FIG. 1 the tip surface 40 of the cutting tool 4 eventually penetrates a part of a pipe wall 1a of the existing pipe 1 toward the center in the radial direction C. The infeed of the cutting tool 4 is thus completed.

Figure 3:
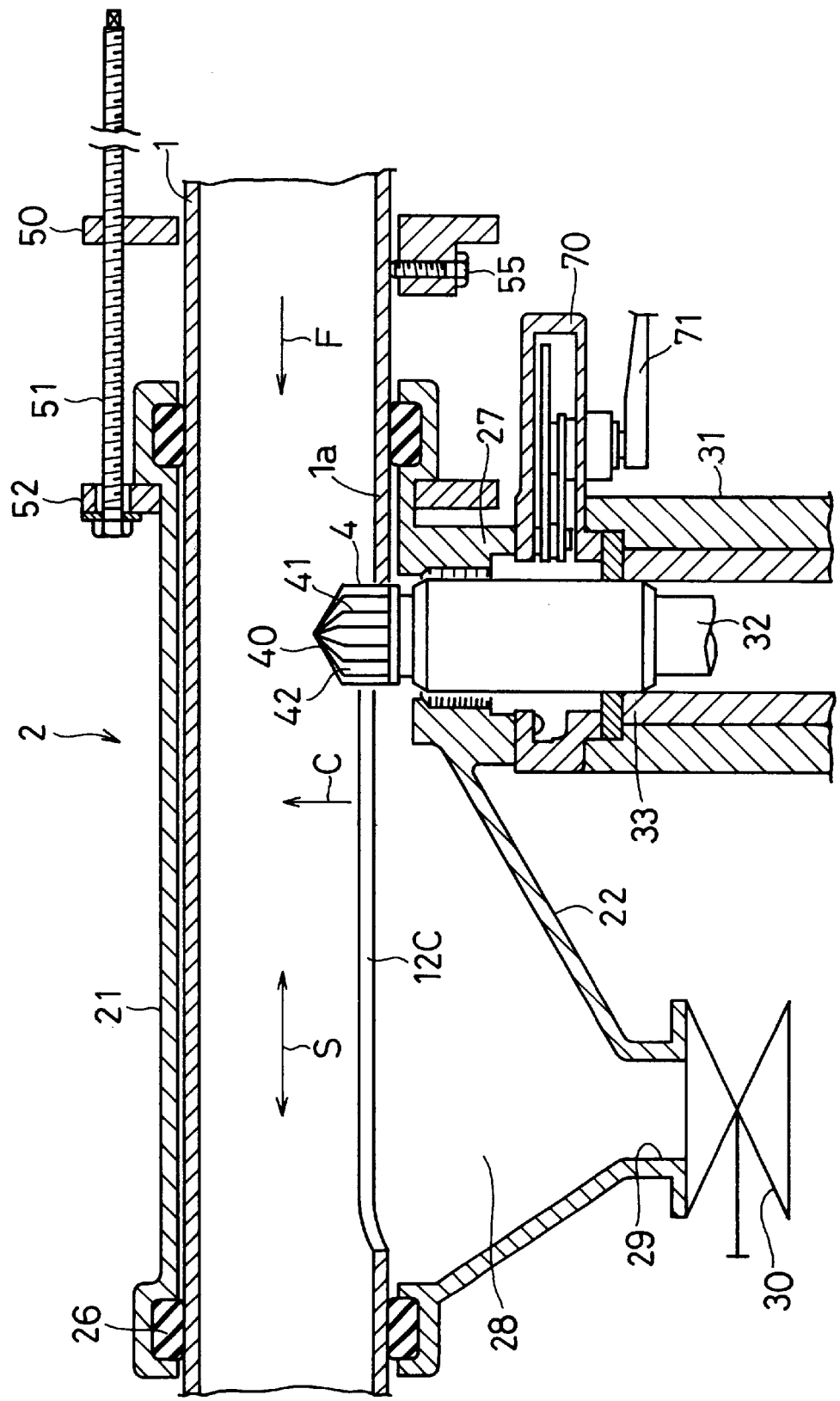
FIG. 3 is a longitudinal sectional view showing a cutting step.

After the completion of this infeed, the feed screw 51 is turned counterclockwise by the operator, whereupon the seal-up housing 2 is displaced toward the upstream (rightward) in the axial direction S so that it comes closer to the fixed plate 50. With this displacement, the cutting tool 4 carrying out the cutting action performs a feed action for cutting the pipe wall 1a. As a result, as illustrated in FIG. 3, an elongated rectilinear cut groove 12C is formed in the axial direction S in the bottom of the existing pipe 1 without any cut-off sections created.

It is to be appreciated that the cut groove 12C has a length enough to allow the dirt reservoir 28 to cover the downstream end of the cut groove 12C.

Tool Removal Step

The cutting unit 3 is removed in accordance with a method described hereinbelow.

The cutting tool 4 is first housed in the cutter case 31 by the operator, after which an operation lever 71 of the operation gate valve 70 is acted upon so as to close the operation gate value 70. The cutting unit 3 is then removed by the operator. After this removal, a known plug insertion machine not shown is fitted by the operator to the operation gate valve 70, then the operation gate valve 70 is opened. Following this opening operation, the operator acts on the plug insertion machine not shown to screw the plug 60 of FIG. 4 into the internally threaded portion 27a of the branching portion 27. After this screwing operation, the operator removes the operation gate valve 70 (FIG. 3) and the plug insertion machine. The operation is thus completed and the piping structure of FIG. 4 is obtained.

Description will then be made in brief of a mechanism for collecting the dirt A.

The dirt A such as sands or metallic powders having a larger specific gravity than water is conveyed in the form of a flow rolling or jumping over the bottom of the existing pipe 1. In this embodiment the dirt reservoir 28 is of greater dimensions in the axial direction S. This means that in spite of the flow of the dirt A in a jumping manner, the dirt A tends to migrate downward as indicated by the arrow of a chain double-dashed line of FIG. 4. Therefore the dirt A can securely be collected. By opening the discharge valve 30 fitted to the drain port 29, the dirt A collected within the dirt reservoir 28 is discharged together with water entraining the same.

It will be appreciated that since the dirt reservoir 28 is disposed downstream of the cutting unit 3 of FIG. 3 in the direction of flow F of the liquid (water), cutting chips which may occur during the cutting operation can also successfully be collected within the dirt reservoir 28 in the same manner with the formation of the cut groove 12C.

Figure 5:
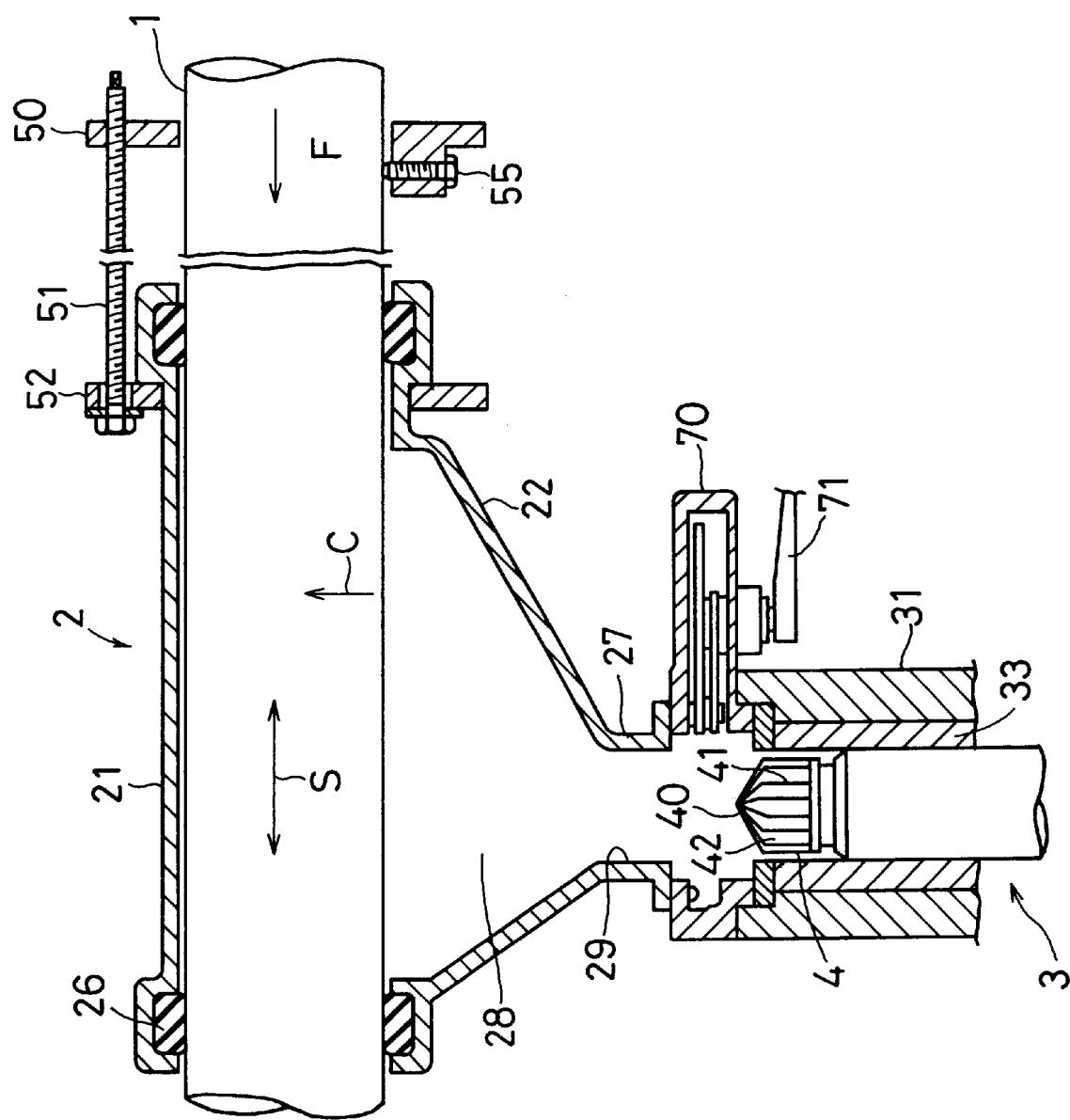
FIG. 5 is a longitudinal sectional view showing an assembling step in accordance with a second embodiment.

Although in the first embodiment the cutting unit 3 has been positioned upstream of the dirt reservoir 28 in the direction of flow F of the liquid (water), the present invention will not necessarily be limited thereto. In the present invention, as seen in FIG. 5, the cutting unit 3 may be mounted on the drain port 29 of the dirt reservoir 28 (or on the branching portion 27) as long as it is capable of cutting the bottom of the existing pipe 1. In this event, the operation gate valve 70 serves as the discharge valve without being dismounted therefrom after the operation.

Figure 6:
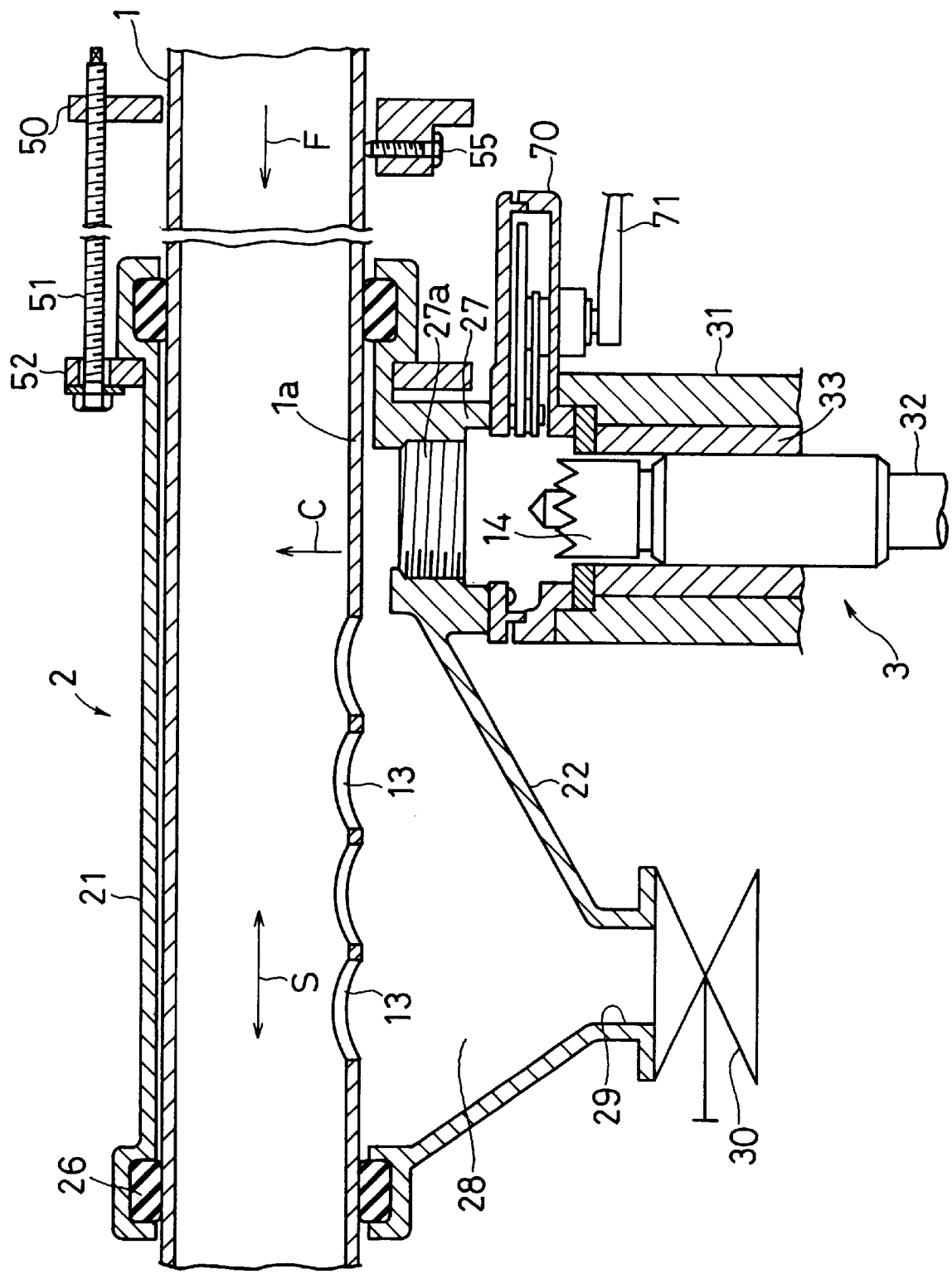
FIG. 6.is a longitudinal sectional view showing a variant.
Figure 7A:
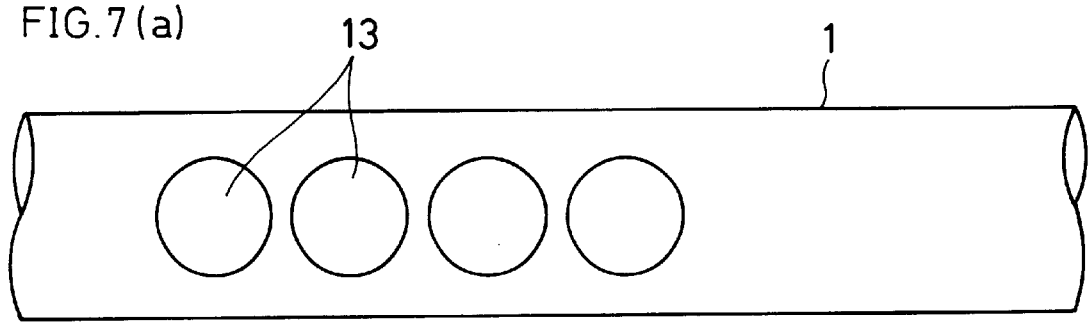
FIGS. 7(a), 7(b) and 7(c) are bottom plan views each showing a variant of a collection opening.
Figure 7B:
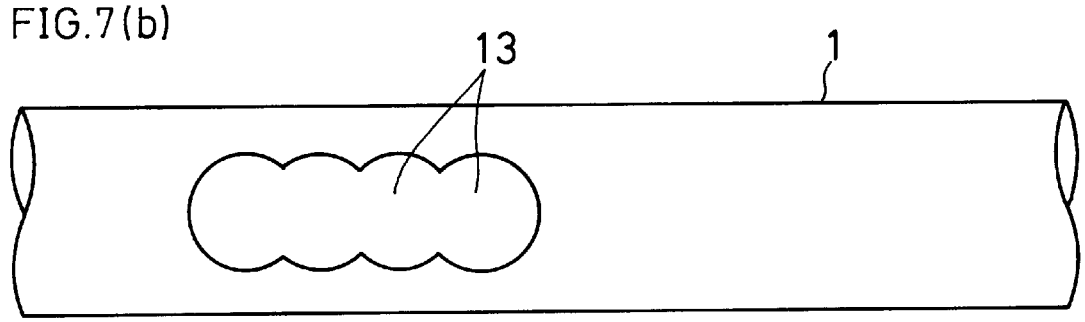
Figure 7C:
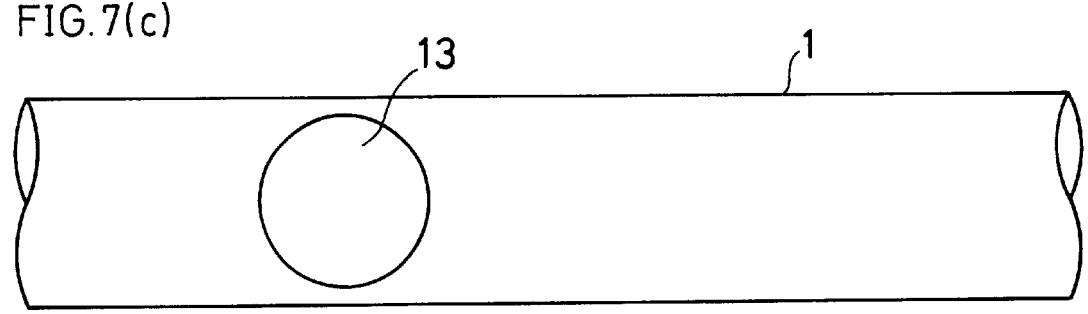

Although in the first embodiment the elongated cut groove 12C has been formed by use of the cutting tool 4 resembling the end mill, the present invention will not necessarily be limited thereto. For example, as can be seen in FIGS. 6 and 7(*a*), circular openings 13 may be formed in immediate proximity to one another in the axial direction S of the existing pipe 1 by means of a known hole saw 14. As seen in FIG. 7(*b*), substantially circular openings 13 maybe formed in a continuous manner in the axial direction S of the existing pipe 1. Furthermore, a single opening 13 may be provided as shown in FIG. 7(*c*).

Figure 8:
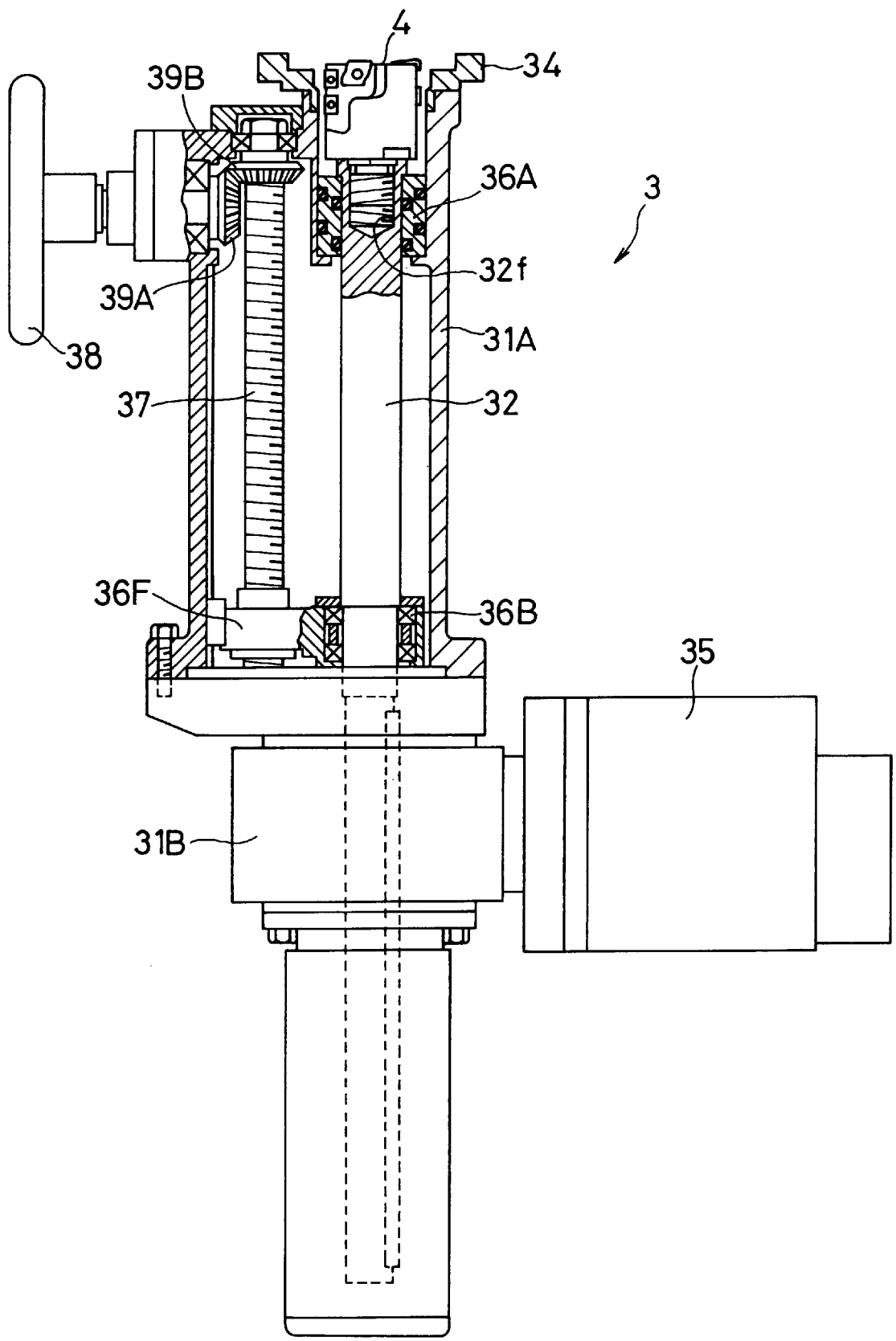
FIG. 8 is a side elevational view partially in section showing a cutting unit by way of example.

Reference is then made to FIG. 8 to describe a preferred example of the cutting unit 3.

In the cutting unit 3 of FIG. 8, its cutter case 31A is firmly fastened via an attachment 34 to the operation gate valve 70 (FIG. 1). An elongated cutter rod 32 extends through the interiors of a cutter case 31A and a gear case 31B. The cutter rod 32 is supported in a freely turnable manner by a first bearing 36A and bearings not shown within the cutter case 31A and the gear case 31B. The cutter rod 32 is turned by the power of an electric motor (an example of the prime mover) 35 by way of reduction gears or bevel gears not shown.

An infeed screw 37 is provided in parallel with the cutter rod 32 within the cutter case 31A. The infeed screw 37 is turned forwardly or reversely via bevel gears 39A and 39B by turning a handle 38. The infeed screw 37 mates with an internally threaded portion formed in a hold 36F. The hold 36F serves to hold the cutter rod 32 by way of a second bearing 36B. Thus, by turning the handle 38, the infeed screw 37 turns so that the hold 36F can advance or retreat, resulting in an advancement or retreat of the cutter rod 32.

At the top of the cutter rod 32 is formed an internally threaded portion 32*f* for threadedly receiving the cutting tool 4.

Figure 9A:
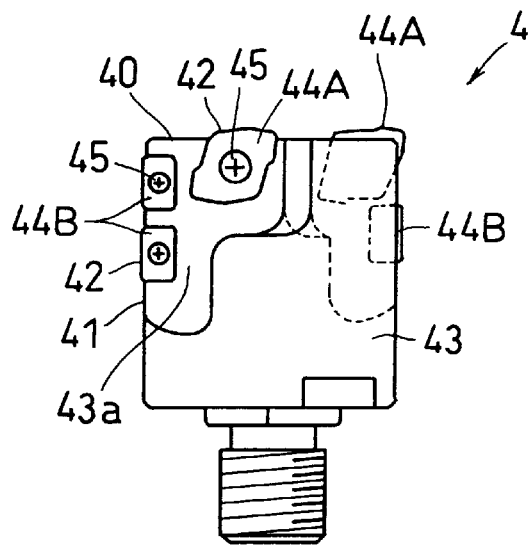
FIG. 9(a) is a side elevational view showing an example of a cutting tool.
Figure 9B:
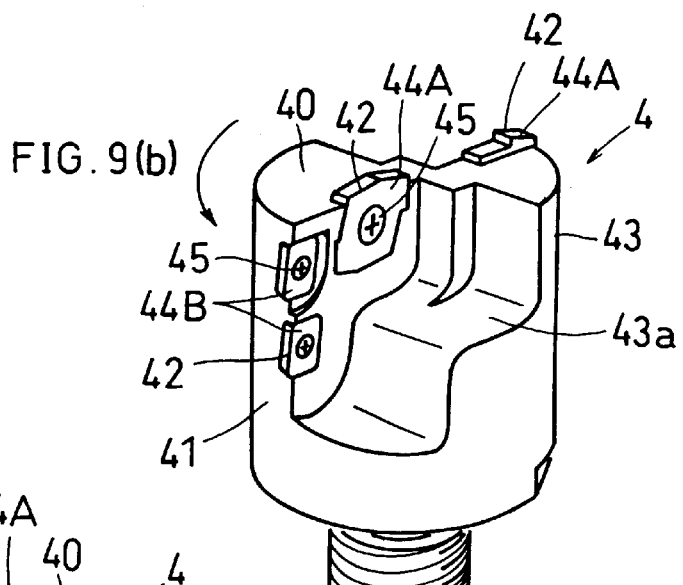
FIGS. 9(b) and 9(c) are perspective views of the same.
Figure 9C:
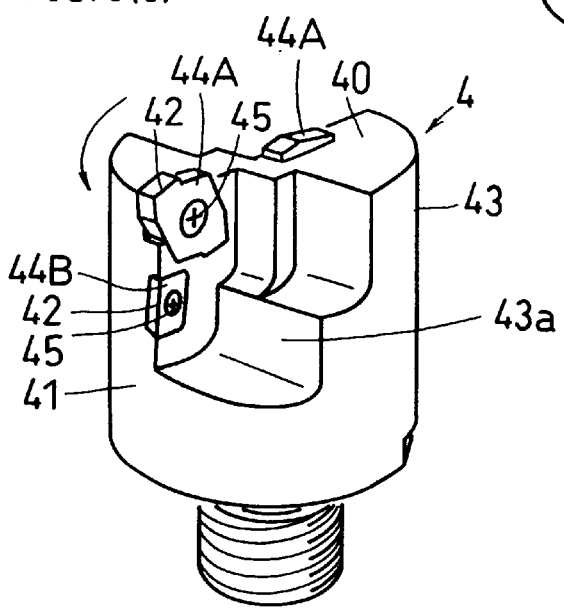

Referring finally to FIGS. 9(*a*) to 9(*c*), a preferred example of the cutting tool 4 will hereinafter be described.

The cutting tool 4 comprises a tool body 43 to be fixedly screwed into the internally threaded portion 32*f* (FIG. 8). First and second chips 44A and 44B are fitted via an externally threaded portion 45 to the tool body 43 in order to ensure that the chips 44A and 44B can be replaced with new ones when the cutting edge 42 has become abraded.

The first chips 44A on one hand provide cutting edges 42 on the tip surface 40 of the substantially cylindrical tool body 43 and make cuts in the existing pipe 1. The second chips 44B on the other provide cutting edges 42 on the peripheral surface 41 of the substantially cylindrical tool body 43 and cut the existing pipe 1. The chips 44A and 44B are preferably made of a hard metal. It is to be noted that the tool body 43 is formed with a large notch 43*a* for the purpose of escaping cutting chips, in such a manner as to confront the first and second chips 44A and 44B.

While the preferred embodiments have been set forth hereinabove in the light of the drawings, it will easily be conceived by any persons with ordinary skill in the art to variously alter or modify the above embodiments from this specification without departing from the sprit or scope of the present invention.

By way of example, the prime mover conferring cutting actions on the cutting tool can be an engine in lieu of the motor. The cutting unit may be mounted on the seal-up housing, previous to the enclosure of the existing pipe by the seal-up housing.

The seal-up housing may be segmented circumferentially into three or four parts.

It will further be appreciated that the present invention encompasses oil or other liquid than water as the liquid flowing through the interior of the existing pipe.

Such variations and modifications are therefore to be construed as ones lying within the scope of the invention.

What is claimed is:

1. A method of cutting an existing pipe, said method comprising an assembling step and a cutting step, wherein said assembling step includes enclosing, in a hermetically sealed manner, a part of said existing pipe by a seal-up housing comprising a plurality of housing parts which are segmented in the circumferential direction of said existing pipe and includes mounting a cutting unit having a cutting tool onto said seal-up housing, and wherein said cutting step includes allowing a radial cut of said cutting tool into said existing pipe while turning said cutting tool to impart to the same a cutting action for cutting the bottom of said existing pipe and includes displacing said seal-up housing in the axial direction of said existing pipe to axially move said cutting tool to impart a feed action to the same simultaneously with said cutting action, whereupon said existing pipe is cut by said cutting tool without any cut-off sections created so that an elongated rectilinear groove is formed in the bottom of said existing pipe in the axial direction thereof.

2. The method of cutting an existing pipe according to claim 1, wherein said cutting tool cuts into said existing pipe toward a substantial radial center thereof until said cutting tool reaches a position at which it penetrates a part of the pipe wall of said existing pipe, after which with said cutting tool penetrating said pipe wall, said cutting tool is given said feed action in conjunction with said cutting action.

3. A fluid supply suspension-free method comprising an assembling step and a drilling step, wherein said assembling step includes enclosing a part of an existing pipe by a seal-up housing comprising a plurality of housing parts which are segmented in the circumferential direction of said existing pipe, said seal-up housing being provided with a collection space adapted to collect dirt or foreign substances through a collection opening formed in the bottom of said existing pipe, and with a drain port for discharging said dirt or foreign substances stored in said collection space, and wherein said drilling step includes forming, without any fluid supply suspension, said collection opening in the bottom of said existing pipe partially enclosed by said seal-up housing so that said dirt or foreign substances can be collected into said collection space through said collection opening.

4. A fluid supply suspension-free method comprising an assembling step, a cutting step and a tool removal step, wherein said method includes preparing a seal-up housing comprising two or more housing parts which are segmented in the circumferential direction of an existing pipe, one of said housing parts being previously provided with a collection space adapted to collect dirt or foreign substances through a rectilinear groove formed in the bottom of said existing pipe, and with a branching portion allowing advancement or retreat of a cutting tool, and wherein said assembling step includes enclosing a part of said existing pipe by said seal-up housing in a hermetically sealed manner and includes mounting a cutting unit having said cutting tool onto said seal-up housing by way of an operation valve, and wherein said cutting step includes allowing a radial cut of said cutting tool into said existing pipe while turning said cutting tool to impart to the same a cutting action for cutting the bottom of said existing pipe and includes displacing said seal-up housing in the axial direction of said existing pipe to axially move said cutting tool to impart a feed action to the same simultaneously with said cutting action, whereupon said existing pipe is cut by said cutting tool without any cut-off sections created so that an elongated rectilinear groove is formed in the bottom of said existing pipe in the axial direction thereof, and wherein said tool removal step includes removing said cutting tool from said branching portion after formation of said rectilinear groove so that said dirt or foreign substances can be collected through said rectilinear groove into said collection space.

5. The fluid supply suspension-free method according to claim 4, wherein said cutting step includes in conjunction with said cutting action allowing said cutting tool to cut into said existing pipe toward a substantial radial center thereof until said cutting tool reaches through said branching portion a position at which it penetrates a part of the pipe wall of said existing pipe, said cutting step including, thereafter with said cutting tool penetrating said pipe wall, imparting to said cutting tool said feed action in conjunction with said cutting action.

6. The fluid supply suspension-free method according to claim 5, wherein said feed action in said cutting step includes a movement of said cutting tool toward the upstream of said existing pipe.

\* \* \* \* \*